US005186956A

United States Patent [19]

Tanino et al.

[11] Patent Number: 5,186,956

[45] Date of Patent: Feb. 16, 1993

[54] ROTARY POWDER COMPRESSION MOLDING MACHINE

[75] Inventors: Tadatsugu Tanino, Ibaraki; Yoshihiro Furuya, Osaka; Toyohiko Takeda, Kobe; Yoshiyuki Endo; Hayao Inoue, both of Osaka, all of Japan

[73] Assignee: Shionogi & Co., Ltd., Osaka, Japan

[21] Appl. No.: 753,629

[22] Filed: Aug. 30, 1991

[30] Foreign Application Priority Data

Aug. 31, 1990 [JP] Japan .............................. 2-92044[U]

[51] Int. Cl.[5] .............................................. B29C 43/00

[52] U.S. Cl. .................................. 425/135; 264/40.4; 425/145; 425/169; 425/345; 425/354

[58] Field of Search ............................ 264/40.1, 40.4; 425/135, 136, 145, 147, 169, 173, 256, 345, 348 R, 353, 354, 355

[56] References Cited

U.S. PATENT DOCUMENTS

| | | | |
|---|---|---|---|
| 3,460,487 | 8/1969 | Kibbe . | |
| 3,836,299 | 9/1974 | Houston et al. | 425/136 |
| 3,898,024 | 8/1975 | Wockener | 425/145 |
| 3,910,739 | 10/1975 | Talis et al. | 425/348 R |
| 4,157,148 | 6/1979 | White | 425/345 |
| 4,642,686 | 2/1987 | Nagano et al. | 264/40.1 |
| 5,032,071 | 7/1991 | Bliss et al. | 425/345 |

FOREIGN PATENT DOCUMENTS

| | | | |
|---|---|---|---|
| 2359474 | 3/1975 | Fed. Rep. of Germany . | |
| 3723651 | 12/1987 | Fed. Rep. of Germany . | |
| 78183 | 12/1970 | German Democratic Rep. | 425/136 |
| 57-50160 | 11/1982 | Japan . | |
| 60-43840 | 9/1985 | Japan . | |

OTHER PUBLICATIONS

Patent Abstracts of Japan, vol. 3, No. 95, (C-55) (Aug. 11, 1979).

Database WPIL, Accession No. 86-073796, Derwent Publications Ltd., London.

Database WPIL, Accession No. 86-110885, Derwent Publications Ltd., London.

*Primary Examiner*—Jay H. Woo
*Assistant Examiner*—Scott Bashey
*Attorney, Agent, or Firm*—Morrison & Foerster

[57] ABSTRACT

A rotary powder compression machine with a horizontal turntable for compressing powder placed into a compression bore between an upper and a lower compression rods. An ultrasonic sensor monitors the amount of powder deposited upstream of the open feed shoe in the rotation direction of the turn-table.

4 Claims, 3 Drawing Sheets

ROTARY POWDER COMPRESSION MOLDING MACHINE

BACKGROUND OF THE INVENTION

1. Field of the Invention:

The present invention relates to a rotary powder compression molding machine used for producing tablets and the like.

2. Description of the Prior Art:

A rotary powder compression molding machine called a tablet machine has been used for producing medicine, food, bubble bath and the like in a tablet shape. The rotary powder compression molding machine comprises a compression molding machine body having a turntable provided with a plurality of bores positioned at a predetermined distance therebetween in the rotation direction, and a powder supply device for supplying powder in each bore of the turntable of the compression molding machine body. The powder is successively supplied in each bore of the turntable by the powder supply device while the turntable rotates, and the powder is compressed for molding in each bore by the time when the turntable completes its rotation of one circle, whereby tablets are successively produced.

A rotary powder compression molding machine in which an open feed shoe is provided in a powder supply device so as to be adjacent to the surface of a turntable of a compression molding machine body has been developed. According to this machine, powder is directly dropped onto the upper surface of the turntable on the upstream side of the open feed shoe in the rotation direction of the turntable.

In the rotary powder compression molding machine provided with this kind of powder supply device, powder is liable to form a bridge in a hopper of the powder supply device. Under this condition, the supply of the powder onto the turntable is prevented. When the powder is directly dropped onto the surface of the turntable, the holdup of the powder in the open feed shoe is substantially small. When the powder is prevented from being supplied from the hopper to the open feed shoe, the amount of the powder which will be loaded into the bore immediately runs short, resulting in the production of defective tablets whose weight does not reach a prescribed value. Moreover, the bridge formed by the powder in the hopper is merely maintained for a short period of time, and at the next moment after the supply of the powder from the hopper to the open feed shoe is terminated, the powder begins to be supplied again. Therefore, it is very difficult to detect the above abnormality under the supervision of operators and inspectors for the operation processes. Accordingly, when the powder is divided to be put into small packages, the shortage of the weight is found, causing great problems in production processes and quality control of the tablets.

As a method for preventing the production of these defective tablets whose weight does not reach a prescribed value, a method for detecting a shortage of the powder in the hopper by disposing a powder sensor in the hopper, a method for detecting a shortage of the powder which will be loaded into the bore by using the change of pressure when the powder is compressed for molding in the bore, and the like have been known. However, according to the former method, the defective tablets caused by the temporary interruption of the supply of the powder when the powder forms a bridge in the hopper cannot be prevented. According to the latter method, the apparatus becomes too large to be applied to the existing machine.

Japanese Utility Model Publication No. 57-50160 discloses a method for regulating the holdup of the powder in the open feed shoe, in which the level and the density of the powder held in the open feed shoe are detected to regulate the amount of the powder so that the holdup of the powder in the open feed shoe is maintained constant. In this method, the powder supply device is forcibly transferred from one end of the open feed shoe to the other end thereof, and the powder is supplied onto the turntable. Because of this, the holdup of the powder in the open feed shoe is greater than that when the powder is supplied onto the turntable from the hopper, and defective tablets caused by the bridge are not likely to be produced. However, in this method, the level and the density of the powder transferred by the open feed shoe are measured, so that it is not possible to prevent the tablets whose weight does not reach a prescribed value from being produced when the powder is not supplied onto the turntable from the open feed shoe.

SUMMARY OF THE INVENTION

The rotary powder compression molding machine of this invention, which overcomes the above-discussed and numerous other disadvantages and deficiencies of the prior art, comprises:

a compression molding machine body having a horizontal turntable provided with a plurality of bores at a distance therebetween in the rotation direction, and means for compressing powder successively filled in each bore on the turntable for molding;

a powder supply device having an open feed shoe adjacent to an upper surface of the turntable in the compression molding machine body, and means for dropping powder on an upstream side of the open feed shoe in the rotation direction of the turntable; and a detecting device having an ultrasonic sensor which is disposed so that an ultrasonic wave is reflected from a region of the upper surface of the turntable on which powder is dropped by the means for dropping powder of the powder supply device, and which detects the intensity of the reflected ultrasonic wave.

In a preferred embodiment, the compression molding machine body comprises an upper rod and a lower rod for each bore, which respectively engage an upper part and a lower part of each bore, powder being filled between the upper rod and the lower rod, and which rotate together with the turntable.

In a preferred embodiment, the upper rod and the lower rod move so that powder filled therebetween is pre-loaded by a pre-loading device and pressed by a pressure device.

In a preferred embodiment, the means for dropping powder is a hopper.

Thus, the invention described herein makes possible the objective of providing a rotary powder compression molding machine having a simple construction and high precision, which is capable of detecting the production of defective tablets because of its property of immediately detecting a state in which the powder is not supplied onto the turntable.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

The present invention will be described by way of illustrating an example.

Figure 1:
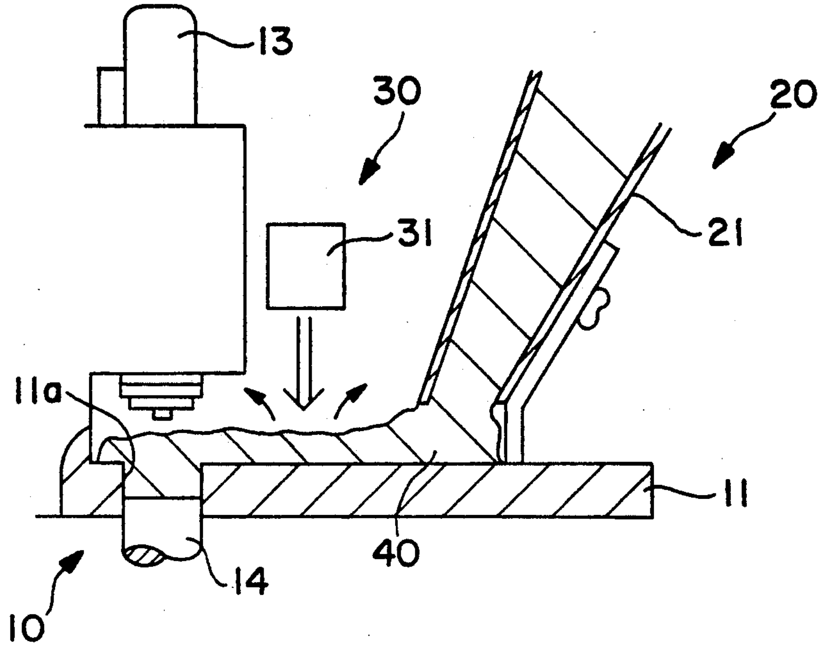
FIG. 1 is a vertical cross-sectional view showing main portions of an example of a rotary powder compression molding machine according to the present invention.
Figure 2:
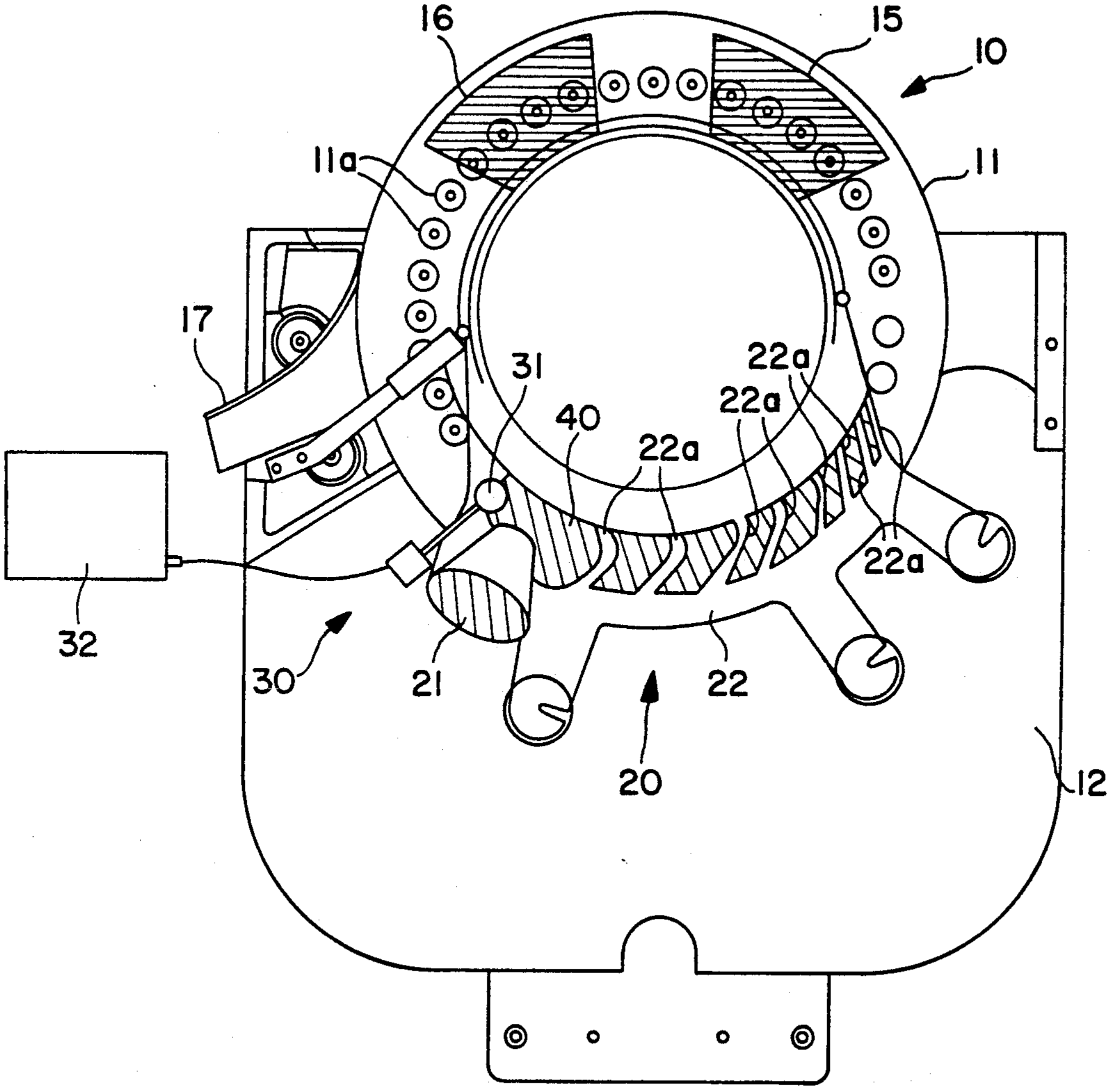
FIG. 2 is a plan view showing a whole construction of the rotary powder compression molding machine.

A rotary powder compression molding machine of the present invention is, for example, used for the production of tablets of medicine and the like. As shown in FIGS. 1 and 2, the rotary powder compression molding machine comprises a compression molding machine body 10 having a horizontal turntable 11, a powder supply device for supplying powder 40 onto the turntable 11, and a detecting device 30 for detecting a shortage of the powder 40 which will be supplied onto the turntable 11 by the powder supply device 20.

The turntable 11 is, for example, made of a metal plate, and the upper surface thereof is flat without unevenness. The turntable 11 has a plurality of bores 11*a* formed at an equal distance therebetween in the rotation direction and is rotated on a frame 12 in the rotation direction at a predetermined speed. Because of this rotation, the powder 40 supplied onto the turntable 11 from the powder supply device 20 successively fills in each bore 11*a*.

In the compression molding machine body 10, an upper rod 13 and a lower rod 14 which are rotated together with the turntable 11 are disposed above and below each bore 11*a*.

The powder supply device 20 comprises a hopper 21 which directly drops the powder 40 to be compressed for molding onto a predetermined region on the turntable 11 and an open feed shoe 22 for holding the powder 40 dropped onto the turntable 11 by the hopper 21. The open feed shoe 22 has a plurality of banks 22*a*, 22*a*, . . . formed on the turntable 11 at an appropriate distance therebetween in the rotation direction. Each bank 22*a* approaches the upper surface of the turntable 11 in accordance with the rotation of the turntable 11. The hopper 21, which is positioned further upstream from the bank 22*a* disposed on the most upstream side in the rotation direction, drops the powder 40 at the periphery of the bores 11*a* on the upper surface of the turntable 11.

A pre-loading device 15 is positioned at an appropriate distance, further downstream from the bank 22*a* disposed on the most downstream side in the rotation direction of the turntable 11 of the open feed shoe 22. A pressure device 16 is positioned further downstream from the pre-loading device 15 at an appropriate distance. The pre-loading device 15 has a pair of pre-loading rollers disposed above and below each bore 11*a* so as to oppose to each other. Also, the pressure device 16 has a pair of pressure rollers in the same way as in the pre-loading device 15.

Each upper rod 13 and each lower rod 14 are raised and lowered while being rotated in the rotation direction together with the turntable 11. On the upstream side from the region to which the hopper 21 opposes in the rotation direction, the lower rod 14 is raised so as to engage each bore 11*a* to predetermined length, and is rotated in the rotation direction while engaged in each bore 11*a*. On the other hand, the upper rod 13 is in a position retracted upward of each bore 11*a* except for the region where the pre-loading device 15 and the pressure device 16 are disposed and the vicinity thereof.

The detecting device 30 has an ultrasonic sensor 31 disposed slightly above the slightly upstream region from the position on the turntable 11 where the powder 40 will be dropped. The ultrasonic sensor 31 is of a reflection-type, and comprises a transmitting portion for transmitting an ultrasonic wave toward the position on the turntable 11 where the powder 40 will be dropped and a receiving portion for detecting an ultrasonic wave reflected from the upper surface of the turntable 11. The intensity of the ultrasonic wave received at the receiving portion of the ultrasonic sensor 31 is displayed in a display monitor 32. The ultrasonic wave transmitted from the transmitting portion of the ultrasonic sensor 31 is irregularly reflected from the powder 40 when the powder 40 is present in the position on the turntable 11 where powder will be dropped, so that the ultrasonic wave detected by the receiving portion of the ultrasonic sensor 31 is substantially attenuated. In contrast, when the powder 40 is not present in the position where powder will be dropped, the ultrasonic wave is reflected from the upper surface (metal surface) of the turntable 11, so that the receiving portion detects the ultrasonic wave with high intensity. Accordingly, a shortage of the powder 40 in the position where powder 40 will be dropped is immediately detected by observing the reflected wave detected by the ultrasonic sensor 31 by the means of the display monitor 32.

In the rotary powder compression molding machine of the present invention having the abovementioned construction, the turntable 11 of the compression molding machine body 10 is rotated under the condition that the powder 40 is filled in the hopper 21 of the powder supply device 20. Each upper rod 13 and each lower rod 14 are rotated in the circumferential direction in accordance with the rotation of the turntable 11. Each bore 11*a* engaged with each lower rod 14 is moved into the region where the powder 40 will be dropped from the hopper 21. The powder 40 dropped onto the turntable 11 from the hopper 21 is partially filled in each bore 11*a* of the turntable 11. Since the powder 40 on the turntable 11 is dammed up by the bank 22*a* positioned on the most upstream side of the open feed shoe 22 due to the rotation of the turntable 11, the powder 40 is spread over the turntable 11 upstream of this bank 22*a* and the powder whose level is approximately equal to that of the upper surface of the turntable 11 is filled in the bore 11*a*. The powder 40 on the turntable 11 partially climbs over this bank 22*a*, and the powder 40 which climbs over this bank 22*a* is dammed up by the bank 22*a* disposed downstream the above bank 22*a*. In the same way, the powder 40 is successively dammed up by each bank 22*a* so that a predetermined amount of powder which climbs up each bank 22*a* is filled in each bore 11*a*.

In this way, when a predetermined amount of powder is filled in each bore 11*a*, each upper rod 13 and each lower rod 14 are pressed by each pre-loading roller of the pre-loading device 15 and each roller of the pressure device 16, and the powder filled in each bore 11*a* is compressed to form tablets. Accordingly, the tablets formed in each bore 11*a* are discharged from each bore 11*a* by the upturn of each lower rod 14 by the time when each bore 11*a* reaches a region where the powder supply device 20 is disposed, and then the tablets are carried out of the compression molding machine 10 by a shoot 17 disposed downstream the pressure device 16.

In the course of the formation of tablets, the detecting device 30 detects the powder 40 on the turntable 11 dropped from the hopper. Operators observe the intensity of the reflection wave detected by the ultrasonic sensor 31 by means of the display monitor and the machine is adapted to be automatically stopped in case of abnormality. When the powder 40 is smoothly dropped from the hopper 21 to the position on the turntable 11 where powder will be dropped, the powder 40 is spread into the region where the ultrasonic wave of the ultrasonic sensor 31 is transmitted. Accordingly, the intensity of the ultrasonic wave transmitted by the ultrasonic sensor 31 is low, and all of the bores 11*a* of the turntable 11 which pass below each bank 22*a* of the open feed shoe 22 is successively filled with the powder 40.

Figure 3:
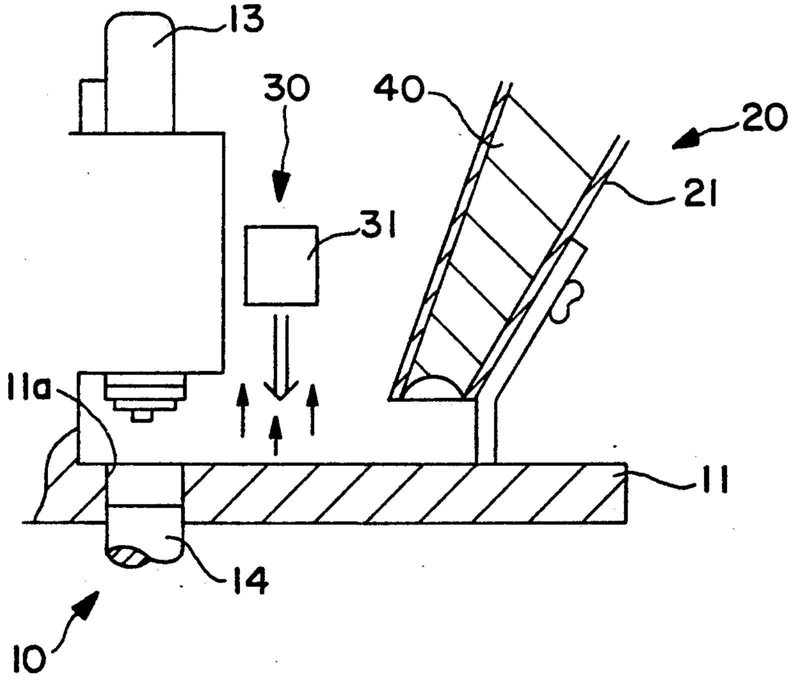
FIG. 3 is a vertical cross-sectional view illustrating the operation of the rotary powder compression molding machine.
Figure 4:
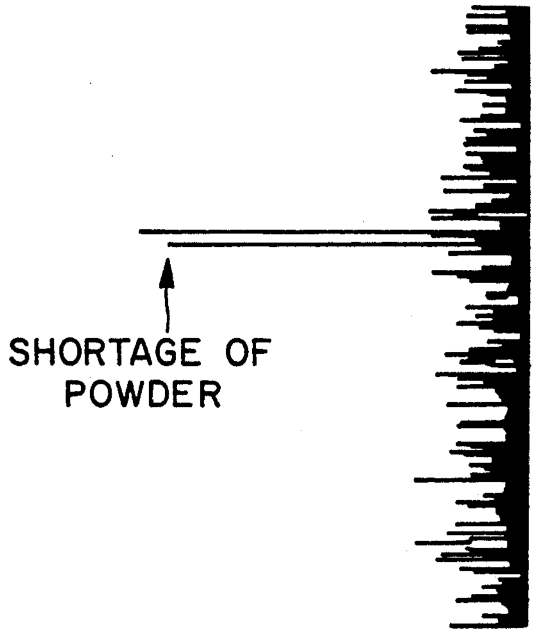
FIG. 4 is a waveform diagram showing the intensity of the ultrasonic sensor.

When the powder 40 forms a bridge in the hopper 21, as shown in FIG. 3, the powder 40 is not dropped from the hopper 21 onto the turntable 11 in spite of the fact that the powder 40 is present in the hopper 21. Under this condition, the power 40 is not present in the region where the ultrasonic wave of the ultrasonic sensor 31 is transmitted, and the ultrasonic wave transmitted from the ultrasonic sensor 31 is reflected from the upper surface of the turntable 11. Because of this, the intensity of the reflection wave displayed by the display monitor 32 rapidly increases as shown in FIG. 4. Accordingly, a state in which the powder 40 is not dropped from the hopper 21 onto the turntable 11 due to the bridge can be immediately detected by observing the reflection wave displayed by the display monitor 32. As a result, when the state in which the powder 40 is not supplied onto the turntable 11 occurs even for a moment, a state in which a predetermined amount of powder 40 is not filled in each bore 11*a* is readily detected. Therefore, there is no possibility that tablets whose weight does not reach a predetermined value are produced.

In the same way, when the powder 40 is the hopper 21 is consumed, this state can be detected by the intensity of the ultrasonic wave displayed by the display monitor 32.

In the above example, the results of the detection by the ultrasonic sensor 31 are displayed by the display monitor 32. For example, when the intensity of the ultrasonic wave detected by the ultrasonic sensor 31 becomes higher than a predetermined value, an alarm can be rung.

As described above, in the rotary powder compression molding machine of the present invention, the ultrasonic sensor is disposed in the direction of the position on the turntable where the powder will be dropped, so that the state in which the powder is not dropped onto the turntable is immediately detected. Accordingly, even when a predetermined amount of powder is not filled in each bore, tablets whose weight does not reach a prescribed value can be prevented from being produced. Moreover, because of the ultrasonic sensor, the detecting device for detecting the state in which the powder is not dropped can detect the shortage of the powder with high precision and can be readily attached to the compression molding machine body or the powder supply device.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A rotary powder compression molding machine, comprising:

a compression molding machine body having a horizontal turntable which is rotatable in a predetermined direction and provided with a plurality of bores at a distance therebetween in a rotation direction of the turntable, and means for compressing powder successively filled in each bore on the turntable for molding;

a powder supply device having an open feed shoe adjacent to an upper surface of the turntable in the compression molding machine body, and means for dropping powder on an upstream side of the open feed shoe in the rotation direction of the turntable; and a detecting device having an ultrasonic sensor which is disposed so that an ultrasonic wave is reflected from a region of the upper surface of the turntable on which powder is dropped by the means for dropping powder of the powder supply device, and which detects an intensity of the reflected ultrasonic wave.

2. A rotary powder compression molding machine, according to claim 1, wherein the compression molding machine body comprises an upper rod and a lower rod for each bore, which respectively engage an upper part and a lower part of each bore, powder being filled between the upper rod and the lower rod, said upper and lower rods being rotatable together with the turntable.

3. A rotary powder compression molding machine according to claim 2, wherein the upper rod and lower rod move so that powder filled therebetween is preloaded by a pre-loading device and pressed by a pressure device.

4. A rotary powder compression molding machine according to claim 1, wherein the means for dropping powder is a hopper.

* * * * *